United States Patent
Prasad et al.

(10) Patent No.: US 7,191,021 B2
(45) Date of Patent: Mar. 13, 2007

(54) REMOTE MANAGEMENT OF FIELD DEVICES IN A MANUFACTURING PLANT

(75) Inventors: Raghavendra TS Prasad, Bangalore (IN); Mannikkath K Premraj, Bangalore (IN)

(73) Assignee: Honeywell International, Morristown, NJ (US)

( * ) Notice: Subject to any disclaimer, the term of this patent is extended or adjusted under 35 U.S.C. 154(b) by 0 days.

(21) Appl. No.: 10/727,252

(22) Filed: Dec. 4, 2003

(65) Prior Publication Data

US 2005/0125085 A1    Jun. 9, 2005

(51) Int. Cl.
G05B 15/00 (2006.01)
G05B 11/01 (2006.01)
G05B 23/02 (2006.01)
G06F 9/32 (2006.01)
H04L 12/28 (2006.01)

(52) U.S. Cl. ............... 700/83; 700/17; 700/19; 700/20; 340/2.1; 340/2.23; 340/3.1; 370/351

(58) Field of Classification Search ............... 700/17, 700/65, 83, 19–20; 709/225, 226–230, 201, 709/208, 221–223; 340/825.01, 825.37, 340/2.1, 2.23, 3.1; 370/225, 351
See application file for complete search history.

(56) References Cited

U.S. PATENT DOCUMENTS

| | | | | |
|---|---|---|---|---|
| 5,682,476 A | * | 10/1997 | Tapperson et al. | 370/225 |
| 6,167,464 A | * | 12/2000 | Kretschmann | 710/15 |
| 2002/0130846 A1 | | 9/2002 | Nixon et al. | |
| 2003/0004952 A1 | | 1/2003 | Nixon et al. | |
| 2003/0043052 A1 | | 3/2003 | Tapperson et al. | |
| 2003/0061295 A1 | * | 3/2003 | Oberg et al. | 709/208 |
| 2003/0109937 A1 | | 6/2003 | Zielinski et al. | |
| 2004/0260518 A1 | * | 12/2004 | Polz et al. | 702/188 |
| 2005/0047331 A1 | * | 3/2005 | Tapperson et al. | 370/225 |

* cited by examiner

*Primary Examiner*—Leo Picard
*Assistant Examiner*—Ronald D. Hartman, Jr.
(74) *Attorney, Agent, or Firm*—Law Firm of Narendra R. Thappeta

(57) ABSTRACT

A client connected to a field device management station (FDMS) by a wireless path. An operator can issue commands to any field devices from the client. As a result, the operator can manage the field devices from any remote location. In addition, the FDMS may be connected to other clients by wire-based paths as well. As a result, commands from both wire-based and wireless clients may be channeled through the FDMS, thereby simplifying tracking of various of configuration changes and status of the field devices. According to another aspect of the present invention, the wireless client is connected to a field device by a wire-line medium. Connectivity between FDMS and field devices is established through wireless client, thereby providing path redundancy (in addition to control network).

19 Claims, 7 Drawing Sheets

REMOTE MANAGEMENT OF FIELD DEVICES IN A MANUFACTURING PLANT

BACKGROUND OF THE INVENTION

1. Field of the Invention

The present invention generally relates to control systems used in manufacturing plants, and more specifically to a method and apparatus for remote management of field devices in a manufacturing plant.

2. Related Art

A manufacturing plant generally contains several field devices connected to a control system, which together implement a desired manufacturing process by controlling the operation of various equipment. Each field device in turn contains components such as sensors (which measure various variables such as temperature, flow, pressure, etc.), control elements (e.g., valves, switches), and transmitters (which transmit any desired information to a processing system, which controls the manufacturing process). For example, field devices containing pressure sensors may be monitored and valves controlled to maintain the pressure level in a boiler (in general equipment) at a desired value.

Field devices are often connected to a central location containing a field device management station (FDMS) and several clients. The FDMS and the clients together are used to manage (e.g., configures, controls, etc.,) the field devices. The clients are generally connected to the FDMS by a wire-based medium. Operators located at the central location may manage field devices by issuing commands using the clients and/or FDMS. Typically, the commands are transferred to the server on the wire-based medium, and the FDMS sends the commands to the field devices according to the medium/protocol (e.g., HART protocol, Foundation Field Bus Protocol) using which the field devices are connected.

There is often a need to remotely (i.e., away from the central location) manage the field devices. For example, assuming that a field device is not responding to specific commands sent via a FDMS, it may be desirable for an operator to be physically close to the field device and issue specific commands, thereby being in a position to directly observe the response of the field device.

In one prior approach, an operator is provided a portable device which directly connects to a field device of interest by a short lead/wire, and the operator may issue commands (including instructions which are together referred to as a 'method' in the relevant arts) from the portable device. Thus, the operator can issue various commands by being in close physical proximity to a field device of interest.

One problem with such a prior approach is that any changes that the operator performs may not be propagated accurately/immediately to the FDMS (and possibly an associated database which maintains the status of various field devices). The inconsistency between the status of field devices and the information at the FDMS may be undesirable at least in some environments. In addition, the operator may not be able to able to physically go very close to a field device of interest to secure the connection (from the portable device), for example, because of hazardous material around in a disaster situation.

What is therefore needed is an improved method and apparatus which enables an operator to remotely manage field devices in a manufacturing plant.

SUMMARY

An aspect of the present invention enables an operator to remotely manage field devices implementing a manufacturing process in a manufacturing plant. In an embodiment, a wire-less connection is provided from a first client to a field device management station (FDMS). The operator may issue a command from the first client to the field devices, and the command is transferred from the first client to the FDMS on the wire-less connection. The FDMS in turn forwards the command to the first field device on a control network connecting the FDMS to the field devices. Due to the wireless connection, the operator can manage the field devices using the first client from any locations.

The FDMS may be connected to other clients by wire-based technologies (e.g., local area network implemented using twisted-pair Ethernet). All the clients connected by wire-based and wireless technologies may channel all commands to the field devices via the FDMS.

Several advantages may be attained as a result. For example, performing configuration changes and maintenance of status information centrally (e.g., maintenance of a central log) may be simplified. In addition, an operator may be able to issue commands from the wireless device at a location close to a field device, and quickly observe/confirm the response of the device.

Another aspect of the present invention provides redundancy of paths from a FDMS to a field device of interest using a wireless connection provided between the FDMS and the client. The client may be connected to the field device of interest in such a scenario. In operation, a command issued by an operator is transferred from the client to the FDMS, from the FDMS to the client, and then finally from the client to the field device of interest. Thus, if path(s) via the control network is non-operational, the path through the wireless connection may be used instead.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION

1. Overview

According to an aspect of the present invention, a wireless connection is provided between a field device management station (FDMS) and a client (e.g., a portable hand-held device). An operator may issue commands to a field device using the client, and the wireless connection is used to transport the commands to the FDMS. The FDMS may then send the commands in appropriate form to the field device using a control network. Due to the wireless connection, the operator may be located at any remote place (including close to the field device) while issuing the commands, thereby simplifying the management task.

The FDMS may be connected to other clients using wire-based medium. Thus, all management commands from both wire-based and wireless clients may be routed through a FDMS, thereby providing several benefits. For example, all changes (in configuration and status) to field devices may be easily indicated in a central database server. In addition, one of the clients may subscribe to a specific status information (e.g., a counter representing the number of open-close cycles for a valve), and any corresponding change (caused by other clients) may be automatically provided to the subscribing client.

Another aspect of the present invention uses the wireless connection noted above to provide a redundant path to manage a field device. The FDMS may send management commands to the client on the wireless connection, and the client may forward the commands in appropriate form to the field device (for example, using a wire-based connection). Such a feature may be useful when a control network otherwise connecting the FDMS and the field devices becomes non-operational.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
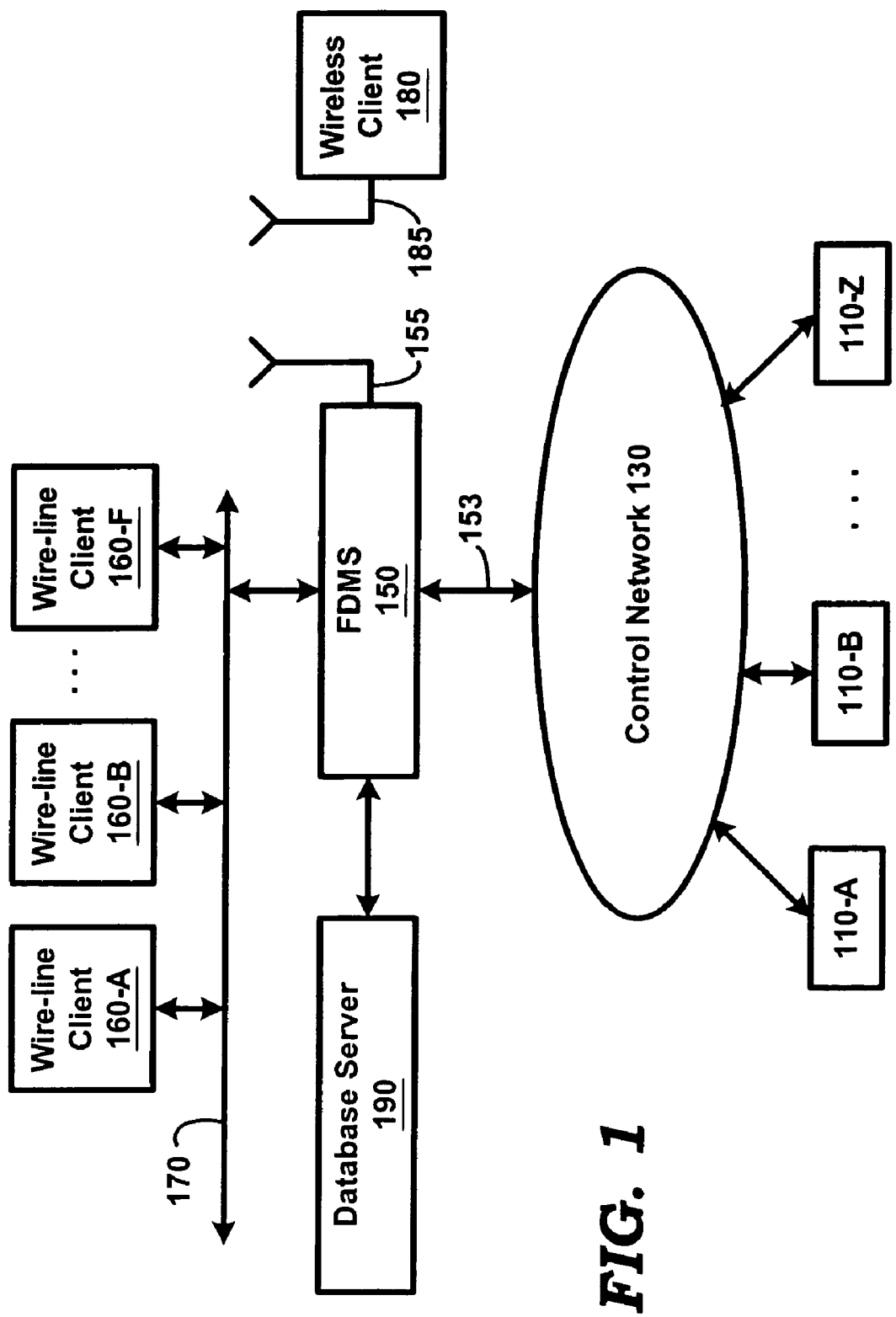
FIG. 1 is a block diagram illustrating an example environment in which the present invention can be implemented.

FIG. 1 is a block diagram illustrating the details of an example environment in which the present invention can be implemented. The block diagram is shown containing field devices 110-A through 110-Z, control network 130, field device management station (FDMS) 150, wire-line clients 160-A through 160-F, wireless client 180, and database server 190. Each block is described below in detail.

Control network 130 provides connectivity between field devices 110-A through 110-Z and FDMS 150. Control network 130 may contain network devices (e.g., multiplexors, modems, termination panels, controllers etc.,) operating according to one or more protocols such as HART, Control Net, and Foundation Field Bus well known in the relevant arts.

Field devices 110-A through 110-Z perform various operations to implement a desired manufacturing process. In addition (or as a part of supporting such a process), each field device may be implemented to support various management commands. Some of the management commands may merely request information (e.g., measured pressure), and some of the commands cause the configuration to be altered (e.g., a valve might be caused to be opened).

Database server 190 provides a central repository for storing information related to configuration of field devices, status of field devices, maintenance schedules, etc. Database server 190 may be integrated into FDMS 150, and can be implemented using one of several commercially available database products (e.g., from companies such as Oracle, and IBM). An aspect of the present invention enables a central log to be maintained within database server 190, with the log indicating the various commands and/or configuration changes that have been performed on the field devices.

Wire-line client 160-A through 160-F is shown connected to FDMS 150 through a local area network (LAN) 170 implemented using wire-based technologies such as Ethernet and Token Ring. Wire-line client 160-A may send on LAN 170 commands (as requested by an operator) directed to field device 110-Z and may receive corresponding responses again on LAN 170. Wire-line clients and LAN 170 may be implemented in a known way.

Wireless client 180 enables an operator to issue commands to any field device of interest from any location generally determined by whether the wireless path to FDMS 150 can be established and used (from that location). The commands may be sent (on antenna 185) to FDMS 150 in a form consistent with the wireless protocol (e.g., 802.11 compliant) used to establish connectivity between wireless client 180 and FDMS 150. The response from corresponding field devices may be received on the same path and provided in a form understandable to the operator.

FDMS 150 receives commands from both wireless client 180 and wire-line clients (160-A through 160-F), and forwards the commands in an appropriate form to a corresponding field device through control network 130. The responses to commands (generated by field devices) may be received on the same path (via control network 130). The received responses may be transmitted to wireless client 180 on antenna 155 in a form consistent with the wireless protocol, and to wire-line clients on LAN 170. In addition, FDMS 150 may provide exclusive access (i.e., prevents access of other clients) to any of the wireless or wire-line clients performing any modifications to a target device.

FDMS 150 is shown associated with antenna 155, which provides the wireless connection to wireless client 180 (by communicating with antenna 185). Due to the absence of additional intermediate components, the wireless connection may be provided reliably. In an alternative embodiment (not shown), the wireless connection may be provided using appropriate network devices provided on LAN 170. Such network devices generally need to provide wireless connection to wireless client, while communicating with FDMS 150 using a protocol consistent with the operation of LAN 170.

FDMS 150 stores data representing the present configuration of each field device (110-A through 110-Z) in database server 190. Thus, when a command successfully changes the configuration of a field device, the after-configuration status may be indicated within database server 190. As all such configuration commands (from both wireless clients and wire-based clients) may be channeled through a single FDMS, re-configuration task and maintenance of the corresponding information (central log) may be simplified.

In addition, due to the processing of commands at a central system, the 'subscribe'-type commands can be processed accurately. A subscribe command generally requests an update when a specified information-of-interest (e.g., up/down status of a device, the present pressure in a field device) changes. Due to the central processing of such commands, any changes may be immediately propagated to the subscribing field device. The manner in which an embodiment of FDMS 150 supports a wireless client 180 is described in detail below.

3. Field Device Management Station (FDMS)

Figure 2:
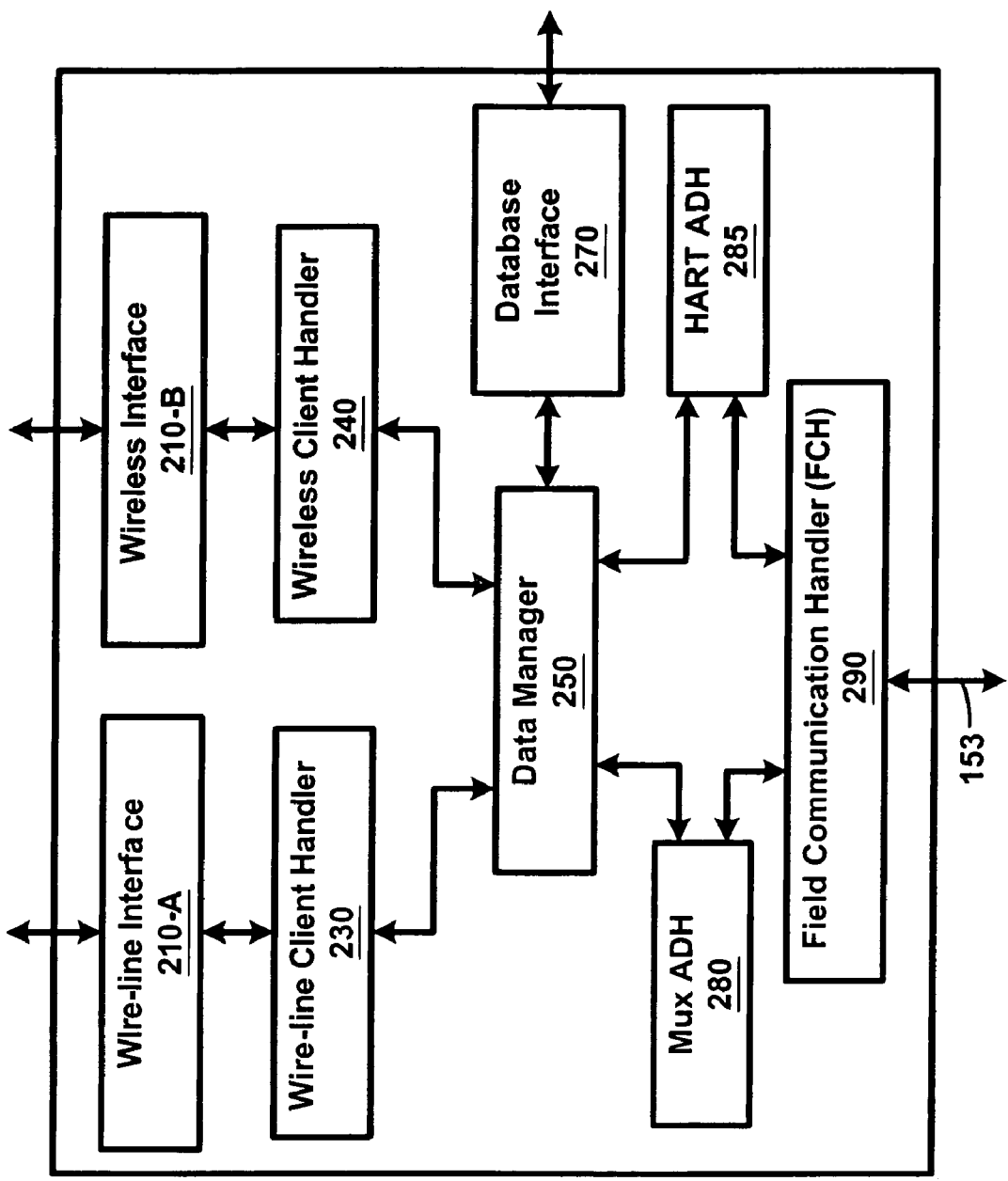
FIG. 2 is a block diagram illustrating the details of an embodiment of a FDMS supporting a wireless client according to an aspect of the present invention.

FIG. 2 is a block diagram illustrating the details of an embodiment of FDMS 150 according to an aspect of the present invention. The block diagram is shown containing wire-line interface 210-A, wireless interface 210-B, wire-line client handler 230, wireless client handler 240, data manager 250, database interface 270, Mux active data handler (ADH) 280, HART ADH 285, and field communication handler (FCH) 290. Each block is described below in detail.

Wireless interface 210-B provides physical, electrical and other protocol interfaces to transmit (receive) signals to (from) wireless client 180 using antenna 155 consistent with wireless standards such as 802.11. Wireless interface 210-B recovers data representing a request (transmitted by wireless client 180 on antenna 185) from the received signals, and the recovered data may be forwarded to data manager 250. The subsequent commands from wireless client 180 may be forwarded to wireless client handler 240.

Response(s) received (corresponding to field device 110-Z) from wireless client handler 240 may be transmitted on antenna 155. Similarly, wire-line interface 210-A may provide the necessary physical, electrical and any other protocol interfaces necessary to transmit/receive signals on/from LAN 170.

Field communication handler (FCH) 290 provides physical, electrical and any other protocol interface to transmit/receive signals on/from control network 130. For illustration, it is assumed that control network 130 contains several components such as modems, multiplexors (which provide wired-connections to devices) and direct connections to devices, which operate consistent with HART protocol (or other field management protocols) well known in the relevant arts. Some of the remaining components are also described below under the same assumption.

The commands received from one of MUX ADH 280 and HART ADH 285 are forwarded to control network 130. The response received (sent by field device 110-Z) from control network 130 may be forwarded to one of Mux ADH 280 or HART ADH 285. FCH 290 may be implemented in a known way.

Wireless client handler 240 is instantiated by data manager 250 when wireless client 180 establishes a connection initially. An instance of a wireless client handler may be created for each wireless client seeking to establish a connection/session. After instantiation, wireless client handler 240 handles the reception/sending of commands/responses.

In general, wireless client handler 240 needs to provide for different display formats, possibly limiting the type of operations that can be performed using wireless clients, etc. Wireless client handler 240 may be implemented using tools such as socket interface widely available in Unix®-type environments and/or DCOM and net remoting commonly available in suite of products available from Microsoft Corporation.

Wire-line client handler 230 may also be implemented similar to wireless handler 240. Both types of handlers may be implemented to interface with data manager 250 using similar data formats, etc. However, handlers 230 and 240 are respectively used to interface with interfaces 210-A and 210-B for communication with respective (wire-line and wireless) clients. Database interface 270 provides a suitable interface (e.g., based on SQL in case of relational databases) to store/retrieve data in/from database server 190, and may be implemented in a known way.

MUX ADH 280 and HART ADH 285 receive respective commands from data manager 250 (sent by wire-line client 160-A), and forwards the commands to FCH 290. The two types of ADHs are included assuming that control network 130 contains direct connections to field devices (in which case HART ADH 285 is used) as well as connections via multiplexors (in which case MUX ADH 280 is used). Responses received from (sent by field device 110-Z) FCH 290 are sent to data manager 250. Mux ADH 280 and HART ADH 285 may be implemented in a known way.

Data manager 250 coordinates and controls the operation of other components to provide various features of the present invention. For example, when a request to initiate a connection (session) is received from wireless client 180, data manager 250 instantiates a corresponding wireless client manager. A unique identifier is assigned to the connection and forwarded to the client requesting the connection. The unique identifier may be included in each command, and may identify the specific client from which a command is received. Similarly, when the client releases the connection, the corresponding client handler is terminated.

In addition, data manager 250 enables caching of parameters, which implies that responses to some of the commands (whether from wireless or wireline clients) can be generated immediately without having to access the corresponding data from the device to which the commands are directed to.

Furthermore, data manager 250 monitors the state of execution of various commands. In an embodiment implemented in the context of HART protocol, data manager 250 permits only one command to be pending to each field device, and thus the response from the device can be easily correlated with the specific command. However, in alternative embodiments, appropriate identifiers may be generated for the specific commands to correlate the response from a field device with a corresponding command. Data manager 250 forwards the response to the client system from which the corresponding command is received.

Data manager 250 may further control the display generated on the client devices. In an embodiment, the specific labels to be displayed and the corresponding values are indicated using extended meta language (XML) well known in the relevant arts. The values may be retrieved from database server 190. In general, clients need to be implemented with a cooperative interface to properly interpret and display the label and value combination, and such implementation may be performed in a known way.

The generated displays may enable an operator to perform various tasks such as selecting from various menu choices to specify a field device of interest (e.g., 110-Z), issue commands for the selected device, and view responses. Different type of displays (e.g., compact) may need to be generated for wireless client 180 at least if the client is implemented with a small screen (as would be usual in the case of portable hand-held devices).

Data manager 250 further supports subscription commands received from various clients. As noted above, a subscription command indicates a specific piece of information of interest, which is immediately displayed on the client system (e.g., 160-A or 180). When the underlying data changes, the change needs to be propagated to the client asynchronously (i.e., without the client having to request an update again).

To support such a feature, data manager 250 maintains a table indicating the specific piece of information (or simple variable) subscribed by each client. When a change occurs to any piece of information indicated in the table, an update message is generated and sent through the corresponding client handler 230 or 240. Due to the central support for both the wire-based and wireless clients, support of the subscription commands may be simplified.

In addition, data manager 250 may interface with database server 190 using database interface 270 to store data representing an audit log of various changes performed on the field devices. As all commands (whether originating from wireless or wire-lines based clients) are routed through FDMS 150, the management of a central log (within database server 190) may be simplified. The log can be updated within a short time after receiving the command. For example, entries may indicate reception of the command, forwarding of the command, and completion of execution of the command in the field device as soon as the corresponding task is performed.

Thus, FDMS 150 supports both wireless and wire-based clients to access field devices as described above. The description is continued with respect to providing a redundant path for a FDMS to access field devices.

4. Providing Path Redundancy

Figure 3:
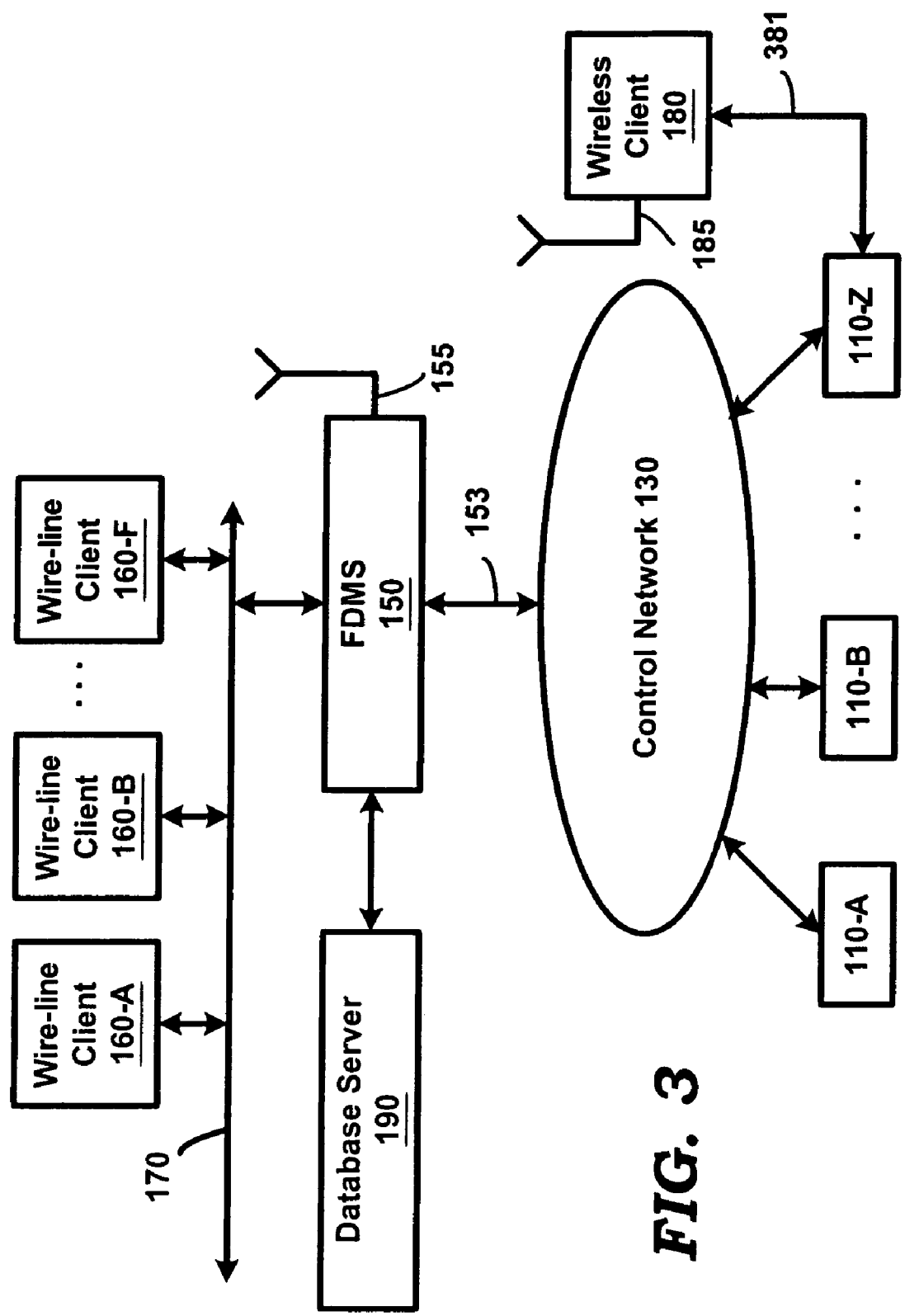
FIG. 3 is a block diagram illustrating an example environment in which path redundancy is provided to access field devices according to an aspect of the present invention.

FIG. 3 is a block diagram illustrating an example environment in which path redundancy is provided from FDMS 150 to access field devices according to an aspect of the present invention. Merely for illustration, the approach(es) is (are) illustrated as an extension of the embodiment(s) of FIG. 1. However, the approach may be implemented in other environments as well. Only the differences of FIG. 3 as compared to FIG. 1 are described below for conciseness.

Wireless client 180 is shown connected to field device 110-Z by path 381. Path 381 may represent a wire-based path. In an embodiment in which field device 110-Z operates consistent with HART protocol well known in the relevant arts, path 381 may contain a HART modem (not shown) connected to field device 110-Z, with USB-type technology being used to provide the physical connection between wireless client 180 and the HART modem. Path 381 (and the corresponding protocols) may be implemented in a known way.

The description is provided with reference to HART protocol merely for illustration. However, the implementation of the approaches in the context of protocols such as Foundation Fieldbus and Profibus, well known in the relevant arts, will be apparent to one skilled in the relevant arts by reading the disclosure provided herein. Such alternative embodiments are contemplated to be covered by various aspects of the present invention.

In operation, wireless client 180 sends a command (directed, for example, to field device 110-Z) using antenna 185. The command is received by FDMS 150, which forwards the command (in appropriate form) back to wireless client 180 using antenna 155. Wireless client 180 may then forward the command to field device 110-Z using path 381 to cause the command to be executed.

The response generated by field device 110-Z may be received by wireless client 180 and forwarded to FDMS 150. FDMS 150 may update the information in database server 190, and again forward the response to wireless client 180. Wireless client 180 may display the responses in a form understandable to the operator.

Thus, even though there is a direct path 381 from wireless client 180 and field device 110-Z, commands/responses are routed through FDMS 150. As a result, any changes to status and configuration information may be maintained centrally within database server 180. In addition, the redundant path available due to the wireless path from wireless client 180, can be used for communications between FDMS 150 and a specific field device of interest. As a result, even if control network 130 is non-operational, an operator may continue to manage a desired device (110-Z). The description is continued with respect to the details of embodiments of FDMS 150 and wireless client 180 which provide such path redundancy.

5. FDMS Providing Path Redundancy

Figure 4:
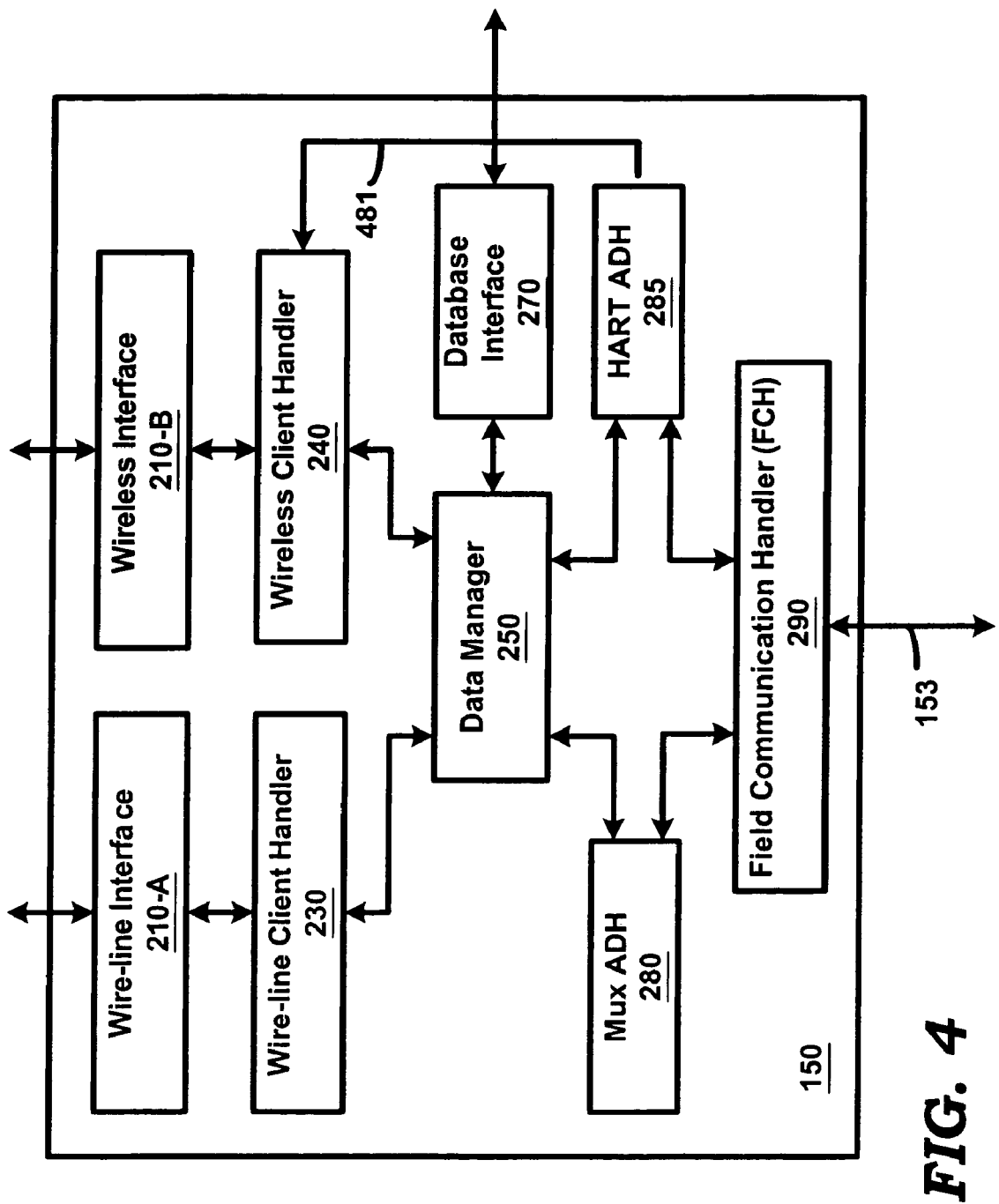
FIG. 4 is a block diagram illustrating the details of a FDMS implemented to provide path redundancy in accessing field devices according to an aspect of the present invention.

FIG. 4 is a block diagram illustrating the details of an embodiment of FDMS 150 implemented to provide path redundancy in accessing field devices according to an aspect of present invention. The block diagram of FIG. 4 contains all the blocks depicted in FIG. 2. Only the differences in FIG. 4 as compared to embodiments of FIG. 2 are described below for conciseness.

Data manager 250 determines whether to forward a command received from wireless client handler 240 on path 153 or via antenna 155. The determination may be based on configuration data received from wireless client 180 when setting up a session or later during trouble-shooting scenarios. Thus, in an embodiment, to switch to the mode of FIG. 4 (from the mode of FIG. 1), wireless client 180 may need to terminate the session corresponding to FIG. 1 and re-establish the session.

HART ADH 285 sends data representing command/response (corresponding to field device 110-Z) to wireless interface 210-B on path 481 (instead of sending commands/responses to field communication handler 290 coupled to control network 130) as specified by data manager 250. In an embodiment, path 381 of FIG. 3 is implemented using only modem-type devices (as opposed to multiplexors), and accordingly a connection between mux ADH 280 and wireless interface 210-B is not shown.

In general, wireless client 180 needs to be implemented compatible with the implementation of FDMS 150 to support the redundant path to the field device of interest. Various compatible implementations (of FDMS 150 and wireless client 180) will be apparent to one skilled in the relevant arts by reading the disclosure provided herein. Such implementations are contemplated to be covered by various aspects of the present invention. The description is continued with reference to the details of an embodiment of wireless client 180.

6. Wireless Client

Figure 5:
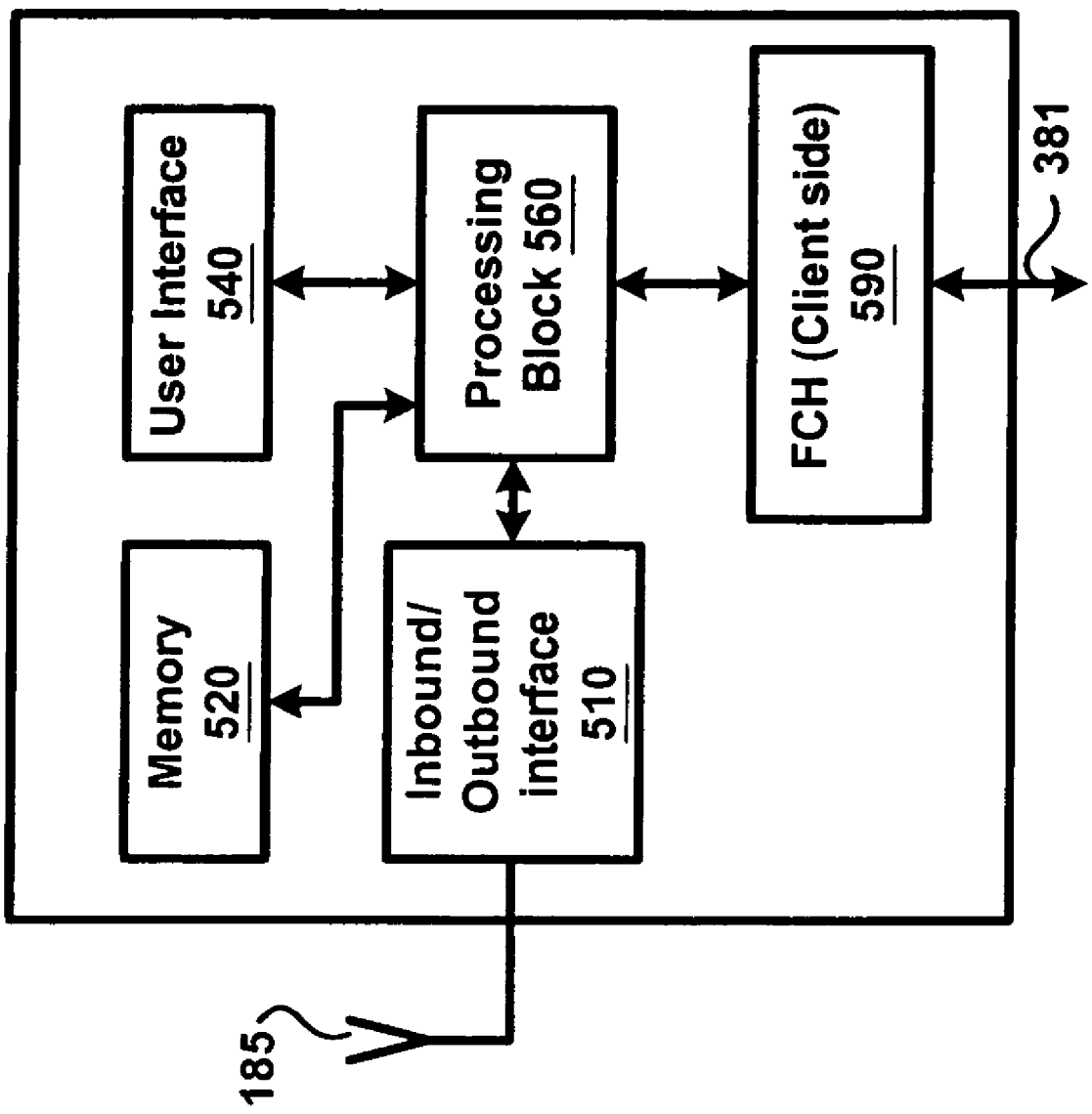
FIG. 5 is a block diagram illustrating the details of an embodiment of a wireless client implemented to access field devices according to an aspect of the present invention.

FIG. 5 is a block diagram illustrating the details of an embodiment of wireless client 180 supporting redundant paths to a field device of interest. The block diagram is shown containing inbound/outbound (I/O) interface 510, memory 520, user interface block 540, processing block 560 and FCH (field communication handler) 590. Each block is described below in detail.

I/O interface 510 (on wireless client side) provides electrical, and protocol interface to receive/transmit data via antenna 185 from/to FDMS 150. The data representing requests, commands (issued by an user of wireless client 180) may be received from processing block 560 and transmitted on antenna 185. Data representing information representing user screens, identifier(s) of wireless client handlers, commands and signal(s) received (from FDMS 150) on antenna 185 is sent to processing block 560.

FCH 590 provides physical, electrical and protocol interface to send and receive data (containing commands and responses) on path 381 consistent with HART communication protocol. As noted above, USB-type protocols may be used to send/receive the data on path 381. FCH 590 receives data representing a command from processing block 560 and forwards the data to field device 110-Z. Signal(s) received from field device 110-Z are forwarded to processing block 560. FCH 590 may be implemented similar to FCH 290.

User interface block 540 receives information (e.g., XML based) from processing block 560 and renders the received information into user readable screens. An user may be allowed to interact (e.g., select a field device, issue commands, examine received signals etc.,) with wireless client 180 using the user screens. The requests and commands issued by an user may be sent to processing block 560 and the signal(s) corresponding to field device 110-Z may be sent to processing block 560.

Processing block 560 operates cooperatively with user interface block 540 to enable an operator to initiate a session with FDMS 150. The operator may indicate whether FDMS 150 is to operate using redundant path (as in FIG. 3) or using control network 130 (as in FIG. 1). Data representing the mode of operation may be saved in memory 520 to enable further processing of commands/responses.

Processing block 560 similarly enables an operator to issue a command by operating cooperatively with user interface block 540. The command is forwarded to I/O interface 510 for transmission to FDMS 150. A unique identifier for the command may be received immediately from FDMS 150. When a response is received later, the identifier is used to correlate the response with the command.

While operating in path redundancy mode, processing block 560 may first send commands (received from user interface block 540) to the wireless interface 510. The same command (in an appropriate form) may be received on inbound/outbound interface 510 (from FDMS 150) and may be forwarded to FCH 590. Responses received from FCH 590 are sent to I/O interface 510, and the same responses received back are sent to user interface block 540 for appropriate display.

Thus, embodiments of wireless client 180 enables wireless client to cooperatively operates with FDMS 150 to manage field device(s). While operating in path redundancy mode, FDMS 150 may access field device(s) through wireless client 180. The description is continued with reference to a flow-chart summarizing the operation of wireless client 180 in cooperation with FDMS 150.

7. Method

Figure 6:
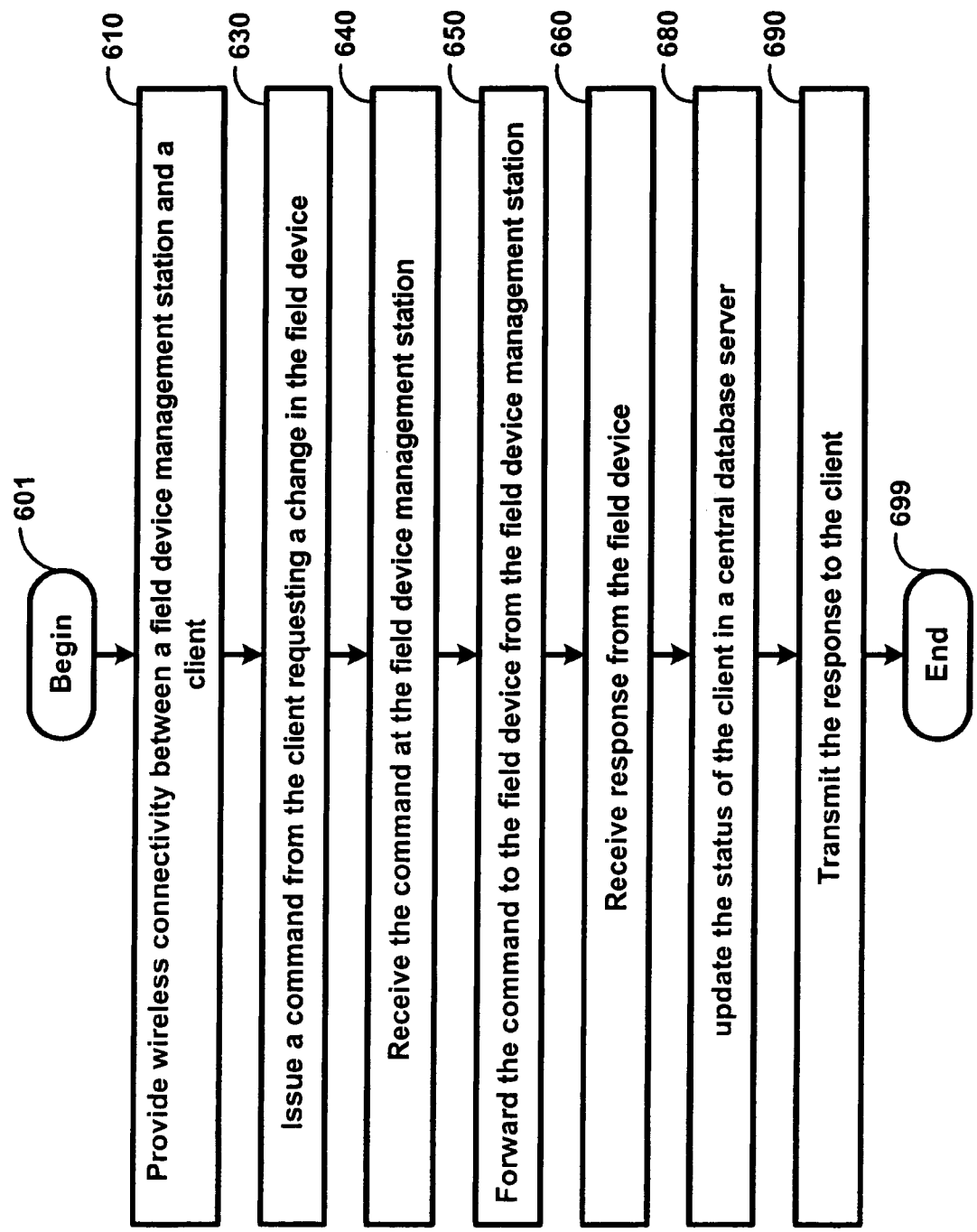
FIG. 6 is a flow-chart illustrating a method by which a wireless client is supported by a field device management station (FDMS) according to an aspect of the present invention.

FIG. 6 is a flow-chart illustrating a manner in which a wireless client is supported by a field device management station (FDMS) according to an aspect of the present invention. The method is described with reference to FIG. 1 and FIG. 2 merely for illustration. The method begins in step 601 and control immediately passes to step 610.

In step 610, wireless connectivity is provided between a field device management station (FDMS) and a client. In an embodiment described above, wireless connectivity is provided using protocols such as 802.11B well known in the relevant arts.

In step 630, a command is issued from the client requesting a change in the field device. In an embodiment, an user of wireless client 180 may issue a command requesting a change in field device 110-Z. For example, the command may change the position of a control valve from 40% open state to 45% open state.

In step 640, the command (issued in step 630) may be received by field device management station on the wireless medium. In step 650, the command may be forwarded to a field device by a field device management station. The command may be forwarded either on control network 130 or the wireless path as described above respectively with reference to FIGS. 1 and 3.

In step 660, field device management station receives a response from the field device. The response may be received on the same path (either on control network or via the wireless path) as in which the command is sent in step 640.

In step 680, field device management station updates the status of the field device in a central database server. For example, the status of field device 110-Z indicating the percentage opening of valve, the client causing the operation of field device 110-Z etc., may be stored in a central database server.

In step 690, field device management station transmits the response (received in step 660) to the client on a wireless medium. For example, FDMS 150 transmits the response received from field device 110-Z. The method ends in step 699. Thus, remote management of field devices in a manufacturing plant may be performed.

8. Software Implementation

Figure 7:
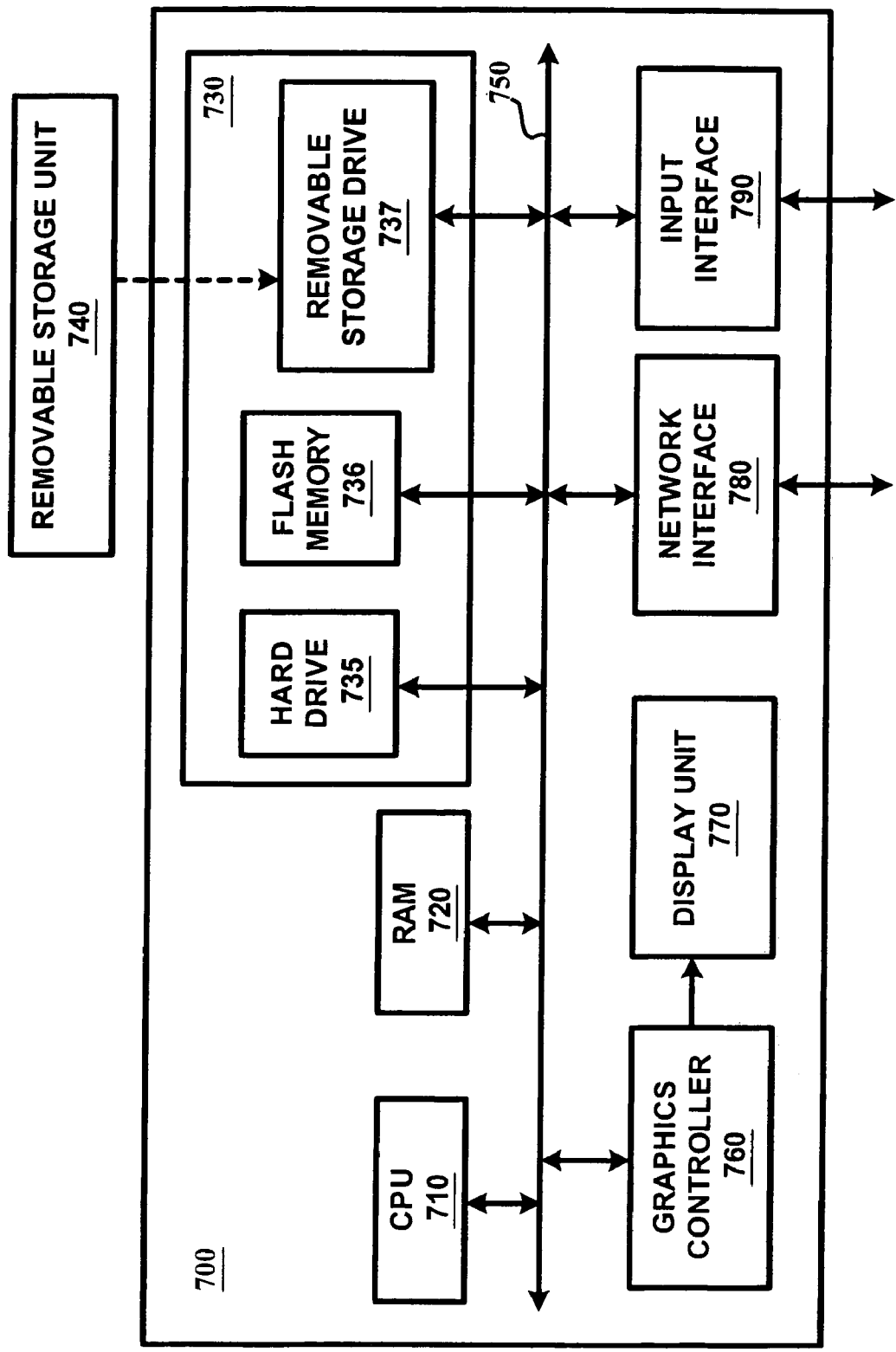
FIG. 7 is a block diagram illustrating the details of digital processing system implemented substantially in the form of software in an embodiment of the present invention.

FIG. 7 is a block diagram illustrating the details of digital processing system 700 implemented substantially in the form of software in an embodiment of the present invention. System 700 may correspond to one of FDMS 150 and wireless client 180. System 700 may contain one or more processors such as central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention. CPU 710 may contain multiple processing units, with each processing unit potentially being designed for a specific task. Alternatively, CPU 710 may contain only a single general purpose processing unit. RAM 720 may receive instructions from secondary memory 730 using communication path 750. In the case of FDMS 150, the instructions cause processing of subscription requests, creation of client handlers, sending XML data representing screens to a corresponding client machine, etc. In the case of client machines, the instructions cause processing of requests and commands issued by an operator, rendering of XML data into appropriate screens, etc.

Graphics controller 760 generates display signals (e.g., in RGB format) to display unit 570 based on data/instructions received from CPU 710. Display unit 770 contains a display screen to display the images defined by the display signals. Input interface 790 may correspond to a key-board and/or mouse. In the case of wireless client 180, graphics controller 760 and input interface 790 enables an operator to issue commands and view the corresponding responses.

Only some of the interfaces are shown in FIG. 7 for conciseness. Both wireless client 180 and FDMS 150 may contain a wireless interface to receive/transmit on respective antennas. Similarly, FDMS 150 may contain an interface to operate with control network 130, and wireless client 180 may contain an interface to communicate directly with a field device of interest.

Secondary memory 730 may contain hard drive 735, flash memory 736 and removable storage drive 737. Secondary memory 730 may store the data and software instructions (e.g., configuration of each field devices and changes thereof), which enable system 700 to provide several features in accordance with the present invention. Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable storage medium having stored therein computer software and/or data.

In this document, the term "computer program product" is used to generally refer to removable storage unit 740 or hard disk installed in hard drive 735. These computer program products are means for providing software to system 700. CPU 710 may retrieve the software instructions, and execute the instructions to provide various features of the present invention as described above.

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of enabling an operator to remotely manage a plurality of field devices designed to implement a process in a plant, said plant further containing a field device management station (FDMS) coupled to said plurality of field devices by a control network, wherein said FDMS is designed to issue a plurality of commands to each of said plurality of field devices on said control network, said method comprising:

providing a wireless connection from a first client, wherein said wireless connection provides communication between said first client and said FDMS, wherein said wireless connection is provided to cover the entire communication path between said FDMS and said first client;

enabling said operator to issue a first command from said first client to a first field device contained in said plurality of field devices, wherein said first command is contained in said plurality of commands;

transferring an indication from said first client to said FDMS on said wireless connection in response to said first command being issued by said operator, said indication indicating that said operator has issued said first command from said first client;

forwarding said first command from said FDMS to said first field device on said control network in response to receiving said indication, whereby said operator manages said plurality of field devices using said first client based on said wireless connection, providing a wire-based connection between a second client and said FDMS;

enabling said operator to issue an another command from said second client, said another command being directed to a second field device contained in said plurality of field devices;

transferring an another indication from said second client to said FDMS on said wire-based connection upon said operator issuing said another command; and forwarding said another command from said FDMS to said second field device on said control network upon receiving said another indication, whereby commands from said first client and said second client are channeled through said FDMS.

2. A method of enabling an operator to remotely manage a plurality of field devices designed to implement a process in a plant, said plant further containing a field device management station (FDMS) coupled to said plurality of field devices by a control network, wherein said FDMS is designed to issue a plurality of commands to each of said plurality of field devices on said control network, said method comprising:

providing a wireless connection from a first client, wherein said wireless connection provides communication between said first client and said FDMS;

enabling said operator to issue a first command from said first client to a first field device contained in said plurality of field devices, wherein said first command is contained in said plurality of commands;

transferring an indication from said first client to said FDMS on said wireless connection in response to said first command being issued by said operator, said indication indicating that said operator has issued said first command from said first client;

forwarding said first command from said FDMS to said first field device on said control network in response to receiving said indication, whereby said operator manages said plurality of field devices using said first client based on said wireless connection, providing a wire-based connection between a second client and said FDMS;

enabling said operator to issue an another command from said second client, said another command being directed to a second field device contained in said plurality of field devices;

transferring an another indication from said second client to said FDMS on said wire-based connection medium upon said operator issuing said another command;

forwarding said another command from said FDMS to said second field device on said control network upon receiving said another indication, whereby commands from said first client and said second client are channeled through said FDMS;

connecting said first client to said second field device contained in said plurality of field devices;

transferring a second command from said FDMS to said first client using said wireless connection, wherein said second command is directed to said second field device; and sending said second command from said first client to said second field device, whereby said second command is forwarded from said FDMS to said second field device without using said control network.

3. The method of claim 2, further comprising enabling said operator to issue said second command from said first client, wherein said FDMS receives a second indication from said first client, said second indication indicating that said second command has been issued at said first client and performs said forwarding said second command upon receiving said second indication.

4. The method of claim 2, wherein said wireless connection is provided to cover the entire communication path between said FDMS and said first client.

5. The method of claim 2, wherein said wireless connection is provided between said first client and a network device, wherein said network device is connected to a network connecting said network device to said FDMS by a wire-based medium.

6. The method of claim 2, further comprising maintaining a central log of said first command, said second command and said another command in said FDMS, wherein said central log is updated after said operator issues said first command, said second command and said another command respectively.

7. A field device management station (FDMS) enabling management of a plurality of field devices, said plurality of field devices being coupled to said FDMS by a control network, said FDMS comprising:
a wireless interface providing connectivity to a first client by a wireless medium; and
a data manager block receiving an indication from said first client on said wireless medium, said indication indicating that a first command has been issued from said first client, said first command being directed to a first field device contained in said plurality of field devices, said data manager block forwarding said first command on said control network in response to receiving said indication,
wherein said first command is issued by an operator from said first client such that said operator manages said plurality of field devices using said first client from locations distant from said FDMS,
a wire-line interface providing connectivity to a second client by a wire-line based medium,
said data manager block receiving another indication from said second client by said wire-line based medium, said another indication indicating that a second command directed to a second field device contained in said plurality of devices has been issued, said data manager block forwarding said second command to said second field device on said control network in response to receiving said another indication.

8. A field device management station (FDMS) enabling management of a plurality of field devices, said plurality of field devices being coupled to said FDMS by a control network, said FDMS comprising:
a wireless interface providing connectivity to a first client by a wireless medium; and
a data manager block receiving an indication from said first client on said wireless medium, said indication indicating that a first command has been issued from said first client, said first command being directed to a first field device contained in said plurality of field devices, said data manager block forwarding said first command on said control network in response to receiving said indication,
wherein said first command is issued by an operator from said first client such that said operator manages said plurality of field devices using said first client from locations distant from said FDMS,
a wire-line interface providing connectivity to a second client by a wire-line based medium,
said data manager block receiving another indication from said second client by said wire-line based medium, said another indication indicating that a second command directed to a second field device contained in said plurality of devices has been issued, said data manager block forwarding said second command to said second field device on said control network in response to receiving said another indication,
wherein said data manager block is operable to receive a third indication from said first client on said wireless medium, said third indication indicating that a third command directed to a third field device contained in said plurality of field devices has been issued from said first client, said third field device being connected to said first client, said data manager block forwarding said third command on said wireless medium to said first client in response to receiving said third indication.

9. The FDMS of claim 8, further comprising:
a wireless client handler provided between said wireless interface and said data manager block, said wireless client handler receiving said first indication on said wireless medium, said wireless client handler further receiving a first response from said data manager block and forwarding said first response on said wireless medium to said first client; and
a wire-line client handler provided between said wire-line interface and said data manager block, said wire-line client handler receiving said second indication on said wire-line based medium, said wire-line client handler further receiving a second response from said data manager block and forwarding said second response on said wire-line based medium.

10. The FDMS of claim 9, wherein said data manager block receives a request to establish a connection from said first client and instantiates said wireless client handler in response to receiving said request.

11. The FDMS of claim 8, wherein said data manager block maintains a central log containing information on said first command and said second command.

12. The FDMS of claim 8, further comprising a database interface maintaining a central log of said first command and said another command, wherein said central log is updated after said operator issues said first command and said another command respectively.

13. A computer readable medium carrying one or more sequences of instructions for causing a field device management station (FDMS) to enable management of a plurality of field devices, said plurality of field devices being coupled to said FDMS by a control network, wherein execution of said one or more sequences of instructions by one or more processors contained in said FDMS causes said one or more processors to perform the actions of:
receiving a first indication from a first client on a wireless medium, said first indication indicating that a first command directed to a first field device contained in said plurality of field devices has been issued from said first client;
forwarding said first command on said control network to said first field device in response to receiving said first indication, wherein said first command is issued by an operator from said first client such that said operator manages said plurality of field devices using said first client, receiving a third indication from a third client on a wire-line based medium, said third indication indicating that a third command directed to a third field device contained in said plurality of devices has been issued from said third client; and forwarding said third command to said third field device on said control network in response to receiving said third indication.

14. A computer readable medium carrying one or more sequences of instructions for causing a field device management station (FDMS) to enable management of a plurality of field devices, said plurality of field devices being coupled to said FDMS by a control network, wherein execution of said one or more sequences of instructions by one or more processors contained in said FDMS causes said one or more processors to perform the actions of:

receiving a first indication from a first client on a wireless medium, said first indication indicating that a first command directed to a first field device contained in said plurality of field devices has been issued from said first client;

forwarding said first command on said control network to said first field device in response to receiving said first indication, wherein said first command is issued by an operator from said first client such that said operator manages said plurality of field devices using said first client, receiving a third indication from a third client on a wire-line based medium, said third indication indicating that a third command directed to a third field device contained in said plurality of devices has been issued from said third client;

forwarding said third command to said third field device on said control network in response to receiving said third indication;

receiving a second indication from said first client on said wireless medium, said second indication indicating that a second command directed to a second field device contained in said plurality of field devices has been issued from said first client, said second field device being connected to said first client; and forwarding said second command on said wireless medium to said first client in response to receiving said indication.

15. The computer readable medium of claim 14, further comprising maintaining a central log containing information on said first command, third command and said second command.

16. A computer readable medium carrying one or more sequences of instructions for causing a client to enable remote management of a plurality of field devices, said plurality of field devices being coupled to a field device management station (FDMS) by a control network, wherein execution of said one or more sequences of instructions by one or more processors contained in said client causes said one or more processors to perform the actions of:

enabling an operator to issue a first command directed to a first field device contained in said plurality of field devices;

sending an indication to said FDMS on a wireless medium, said first indication indicating that said command directed to said first field device has been issued;

receiving a first response on said wireless medium from said FDMS;

wherein said operator manages said plurality of field devices using said client, wherein said client is connected to a second field device by a path, enabling said operator to issue a second command from said client, wherein said second command is directed to said second field device contained in said plurality of field devices;

sending a second indication to said FDMS on said wireless medium indicating that said second command directed to said second field has been issued;

receiving said second command from said FDMS on said wireless medium; and forwarding said second command to said second field device on said path after said receiving from said FDMS.

17. A method of enabling an operator to remotely manage a plurality of field devices designed to implement a process in a plant, said plant further containing a field device management station (FDMS) coupled to said plurality of field devices by a control network, said method comprising:

providing a wireless connection from a first client, wherein said wireless connection provides communication between said first client and said FDMS;

enabling said operator to issue a first command from said first client to a first field device contained in said plurality of field devices;

transferring said first command from said first client to said FDMS on said wireless connection;

forwarding said first command from said FDMS to said first field device on said control network, whereby said operator manages said plurality of field devices using said first client, connecting said first client to a second field device contained in said plurality of field devices;

transferring a second command from said FDMS to said first client using said wireless connection, wherein said second command is directed to said second field device;

sending said second command from said first client to said second field device, whereby said second command is forwarded from said FDMS to said second field device without using said control network; and enabling said operator to issue said second command from said first client, wherein said FDMS receives said second command and performs said forwarding said second command.

18. The method of claim 17, wherein said wireless connection is provided to cover the entire communication path between said FDMS and said first client.

19. A method of enabling an operator to remotely manage a plurality of field devices designed to implement a process in a plant, said plant further containing a field device management station (FDMS) coupled to said plurality of field devices by a control network, wherein said FDMS is designed to issue a plurality of commands to each of said plurality of field devices on said control network, said method comprising:

providing a wireless connection from a first client, wherein said wireless connection provides communication between said first client and said FDMS;

enabling said operator to issue a first command from said first client to a first field device contained in said plurality of field devices, wherein said first command is contained in said plurality of commands;

transferring an indication from said first client to said FDMS on said wireless connection in response to said first command being issued by said operator, said indication indicating that said operator has issued said first command from said first client;

forwarding said first command from said FDMS to said first field device on said control network in response to receiving said indication, whereby said operator manages said plurality of field devices using said first client based on said wireless connection, providing a wire-based connection between a second client and said FDMS;

enabling said operator to issue an another command from said second client, said another command being directed to a second field device contained in said plurality of field devices;

transferring an another indication from said second client to said FDMS on said wire-based connection upon said operator issuing said another command; and forwarding said another command from said FDMS to said second field device on said control network upon receiving said another indication, whereby commands from said first client and said second client are channeled through said FDMS; and maintaining a central log of said first command and said another command in said FDMS, wherein said central log is updated after said operator issues said first command and said another command respectively.

* * * * *